(12) United States Patent
Yamashita et al.

(10) Patent No.: US 8,697,269 B2
(45) Date of Patent: Apr. 15, 2014

(54) SEALED BATTERY

(75) Inventors: Syuichi Yamashita, Moriguchi (JP);
Haruhiko Yamamoto, Moriguchi (JP)

(73) Assignee: SANYO Electric Co., Ltd.,
Moriguchi-shi (JP)

( * ) Notice: Subject to any disclaimer, the term of this patent is extended or adjusted under 35 U.S.C. 154(b) by 1454 days.

(21) Appl. No.: 12/331,843

(22) Filed: Dec. 10, 2008

(65) Prior Publication Data

US 2009/0148767 A1 Jun. 11, 2009

(30) Foreign Application Priority Data

Dec. 10, 2007 (JP) ................. 2007-318668

(51) Int. Cl.
*H01M 2/12* (2006.01)
(52) U.S. Cl.
USPC .................................. 429/82; 429/53; 429/7
(58) Field of Classification Search
USPC .............. 429/82–89, 181, 175, 53, 56, 61, 72
See application file for complete search history.

(56) References Cited

FOREIGN PATENT DOCUMENTS

| JP | 6-140011 A | 5/1994 | | |
|---|---|---|---|---|
| JP | 6-338305 A | 12/1994 | | |
| JP | 8-115714 A | 5/1996 | | |
| JP | 8-153510 A | 6/1996 | | |
| JP | 10-64499 A | 3/1998 | | |
| JP | 10-241653 A | 9/1998 | | |
| JP | 11-86822 A | 3/1999 | | |
| JP | 2000-90891 A | 3/2000 | | |
| JP | 2006012604 A | * | 1/2006 | |
| WO | WO 2008/106834 | * | 9/2008 | ............ H01M 2/04 |

OTHER PUBLICATIONS

English translation of JP 2006-012604 A from ipdl prindted Jul. 2, 2012.*
Machine translation of JP 08-153510.*
Japanese Office Action dated Nov. 8, 2012, issued in corresponding Japanese patent application No. 2007-318668.

* cited by examiner

*Primary Examiner* — Maria J Laios
(74) *Attorney, Agent, or Firm* — Westerman, Hattori, Daniels & Adrian, LLP

(57) ABSTRACT

A sealed battery terminal 18 of a first aspect of the invention includes an electrically-conductive terminal cap 19, a rupture disk 25 made of flexible electrically conductive material electrically connected to the electrically-conductive terminal cap 19, and an electrically-conductive terminal plate 20 abutting the rupture disk 25. In the sealed battery terminal 18, an opening 23c is formed in the terminal plate 20, the rupture disk 25 is arranged to close the opening 23c, and an abutting part of an inner periphery of the opening of the terminal plate 20 and the rupture disk 25 is welded by a high energy beam at a plurality of places. Accordingly, a sealed battery terminal having a safety valve system in which the rupture disk placed in the cap and the terminal plate are electrically connected directly by welding with the high energy beam can be provided.

12 Claims, 7 Drawing Sheets

SEALED BATTERY

TECHNICAL FIELD

The present invention relates to a sealed battery having a safety valve system.

BACKGROUND ART

The internal pressure of a sealed battery sometimes increases abnormally depending on the conditions of use. For example, nonaqueous electrolyte secondary batteries, represented by a lithium ion secondary battery, have a character such that their internal pressure increases abnormally when overcharge occurs and the internal pressure also increases when overcurrent occurs due to a short-circuit. If the internal pressure of the battery increases abnormally causing an outer can of the battery to explode, electronic equipment containing the battery is damaged. Furthermore, leakage of corrosive gas or an electrolyte from the exploded outer can has adversely affects corrosion of the electronic equipment. In order to avoid these drawbacks, an explosion-proof sealed battery has a system to prevent an abnormal increase of the internal pressure. For example, the abnormal increase of the internal pressure of the battery in case of the overcharge can be prevented by breaking current in the battery. This is because chemical reactions do not occur in the battery when the current breaks.

As systems to prevent the abnormal increase of the internal pressure, JP-A-6-140011, JP-A-11-86822, JP-A-6-338305, and JP-A-8-153510 disclose sealed battery terminals including an electrically-conductive flexible valve deformable by a battery pressure increase in a positive or a negative electrode terminal cap and a valve support electrically connected to the valves. In these safety valve systems, when the battery internal pressure increases a little, the electrical connection between the valve and the valve support is broken by valve deformation, and when the battery internal pressure increases much more to increase the valve deformation, the valve is broken to break the electrical connection between the valve and the valve support permanently.

The structure of the sealed battery terminal disclosed in JP-A-8-153510 will be explained with reference to FIG. 7. FIG. 7 is a longitudinal sectional view showing the sealed battery terminal disclosed in JP-A-8-153510.

The sealed battery terminal 50 includes a metal cap terminal 51, a flexible metal rupture disk 52 placed under the cap terminal 51 and the rupture disk 52 being deformed with increase of battery internal pressure, an insulating ring 53 placed under the rupture disk 52, and a punched metal plate 54 placed under the insulating ring 53 and the plate 54 having at least a hole at a central portion of the plate. A strip-shaped terminal plate 56 made of a ribbon metal plate bended convexly is crimped to the punched metal plate 54 interposing an insulating plate 55, and an opening part 57 is arranged at a convex part 56a of the strip-shaped terminal plate 56. The convex part 56a is inserted into a center hole of the punched metal plate 54, and a top surface of the convex part 56a is partially welded to the rupture disk 52 to form a welded part 58. Accordingly, the rupture disk 52 and the strip-shaped terminal plate 56 are electrically connected with each other through the welded part 58. The welded part 58 has a ring shape with a circular non-welded part corresponding to the opening part 57, and when a battery internal pressure reaches a predetermined value, the welded part 58 is broken by a stress deforming a central portion of the rupture disk 52 toward outside to break the electrical connection between the rupture disk 52 and the strip-shaped terminal plate 56.

In the sealed battery terminal 50 of the related-art example described above, since the welded part 58 is formed between the rupture disk 52 and the convex part 56a of the strip-shaped terminal plate 56, the working pressure can be controlled by changing not only the thickness of the flexible metal rupture disk 52 but also the welded area of the welded part 58. Accordingly, the sealed battery terminal 50 of the related-art example described above has an advantageous effect that a sealed battery terminal with less variation and high reliability is obtained, since even when an increase of the battery internal pressure due to short circuit, overcharge, reverse-charge or the like of the battery deforms the rupture disk 52 to break the welded part 58, it does not occur that a central portion of the welded part 58 does not break completely to maintain abutment between the safety rupture disk 58 and the convex part 56a of the strip-shaped terminal plate 56.

In the sealed battery terminal 50 disclosed in JP-A-8-153510, the welded part 58 is subjected to full penetration welding, since the rupture disk 52 and the convex part 56a of the strip-shaped terminal plate 56 are lap-welded. This also applies to the sealed battery terminal disclosed in JP-A-6-338305 is same. Furthermore, JP-A-6-338305 and JP-A-8-153510 disclose that as a forming method of a welded part of a sealed battery terminal, ultrasonic welding or laser welding can be used so as to set various welding conditions easily.

Since ultrasonic welding causes stress to the welding member, it is hard to use, especially when the welding member has a partially thin notch part. On the other hand, in laser welding, since the irradiation area is small, even a welding member with a partial notch is no trouble. However, if a welded part has been subjected to full penetration welding as mentioned above, laser welding has the problem that the laser irradiation conditions are quite limited and lack productivity, and due to variation of the thickness, size or the like of a welding member, the welding may be too weak, or too strong to stave the welding member. However, in order to improve manufacturing efficiency, it is required to adopt a welding means using a high energy beam such as a laser beam and an electron beam that can be emitted away from the welding member rather than the ultrasonic welding in which the welding means needs a direct contact to the welding member.

SUMMARY

An advantage of some aspects of the invention is to provide a sealed battery terminal having a safety valve system in which a rupture disk placed in a cap and a terminal plate are directly electrically connected by welding with a high energy beam such as a laser beam, and a sealed battery including the sealed battery terminal.

According to a first aspect of the invention, a sealed battery terminal includes an electrically-conductive terminal cap, a rupture disk made of flexible electrically-conductive material electrically connected to the electrically-conductive terminal cap, and an electrically-conductive terminal plate abutting the rupture disk. In the sealed battery terminal, an opening is formed in one of the rupture disk and the terminal plate, and the other of the rupture disk and the terminal plate is arranged to close the opening. An abutting part of an inner periphery of the opening of one of the rupture disk and the terminal plate and the other of the rupture disk and the terminal plate is welded by a high energy beam, and an outer periphery of a welding position of the terminal plate is provided with a supporting part thinner than the other part of the terminal plate.

The sealed battery terminal according to the present aspect of the invention needs to have an opening formed in one of the rupture disk and the terminal plate. If the opening is formed in one of the rupture disk and the terminal plate, high energy beam irradiation can target the abutting part of the inner periphery of the opening and the other of the rupture disk and the terminal plate to form a welded part easily. Since the welded part does not have to penetrate the rupture disk or the terminal plate, the welded part is formed simply by the irradiation of the high energy beam with lower output power than in the related-art example described above. Therefore, an irradiation condition of the high energy beam is extended, so that both productivity and quality are stabilized.

In the sealed battery terminal according to the present aspect, if there is only one welding position at the abutting part of the inner periphery of the opening in one of the rupture disk and terminal plate and the other of the rupture disk and the terminal plate, since the breaking strength of the welded position has a directional property to vary a working pressure as a safety valve, it is preferable that a plurality of places be welded, and when a plurality of places are welded, the respective positions be welded symmetrically.

Furthermore, in the sealed battery terminal of the present aspect, it is preferable that the opening be formed in the terminal plate.

When the opening is formed in the rupture disk, in order to keep a sealed state, circumference welding is needed along the opening of the rupture disk, however when the opening is formed in the terminal plate, the rupture disk itself can ensure the sealed state, which requires only a few welded positions. Accordingly, the formation of the opening in the terminal plate improves production efficiency.

Furthermore, in the sealed battery terminal of the present aspect, it is preferable that a welded part by the high energy beam be irradiated with the high energy beam from near the center of the opening in an oblique direction.

If the high energy beam is emitted from near the center of the opening of one of the rupture disk and the terminal plate in the oblique direction, since a welding position is easy to be targeted, a welding spot with a predetermined size at a predetermined position can be formed accurately. In this manner, when the high energy beam is emitted from near the center of the opening of one of the rupture disk and the terminal plate in the oblique direction, since the melting part extends outwardly of the opening, an examination of an extended direction of the melting part shows a slope angle of the irradiation.

Furthermore, in the sealed battery terminal of the present aspect, it is preferable that the irradiation direction of the high energy beam be in a range of 20° to 60° with respect to an axis that is perpendicular to the opening.

If the irradiation direction of the high energy beam is less than 20° to the axis perpendicular to the opening, since the irradiation direction of the high energy beam is very close to perpendicular, it is difficult to target a predetermined welding position accurately, and since the high energy beam is emitted strongly to the member not formed with the opening, it is difficult to form a good welded part. Furthermore, if the irradiation direction of the high energy beam is more than 60° with respect to the axis perpendicular to the opening, since an opening diameter has to be enlarged to target a predetermined welding position and the high energy beam is emitted strongly to a wall of the opening, it is difficult to form a good welded part.

Furthermore, in the sealed battery terminal of the present aspect, a convex part fitting the opening formed in the terminal plate may be formed in the rupture disk, and the welded part by the high energy beam may be an abutting part of an outer periphery edge of the convex part of the rupture disk and the inner periphery of the opening of the terminal plate.

With the sealed battery terminal mentioned above, since the high energy beam can be emitted from a perpendicular direction, the welded part is formed easily.

Furthermore, in the sealed battery terminal of the present aspect, it is preferable that the supporting part of the terminal plate be provided with a notch thinner than the supporting part.

If the notch is formed, since the thinner supporting part in the terminal plate is broken smoothly, a current is broken stably, which is advantageous.

Furthermore, in the sealed battery terminal of the present aspect, it is preferable that the high energy beam be a laser beam or an electron beam.

With the sealed battery terminal of the present aspect, since both the laser beam and the electron beam are commonly used as a high energy beam for welding, a sealed battery terminal with high reliability and quality as a safety valve is obtained.

Furthermore, a sealed battery of according to another aspect the invention includes any one of the sealed battery terminals described above.

With the sealed battery of the invention, a sealed battery with the advantageous effects of the sealed battery terminal according to the above-described aspect of the invention is obtained.

BRIEF DESCRIPTION OF THE DRAWINGS

Some aspects of the invention will be described with reference to the accompanying drawings, wherein like numbers reference like elements.

DESCRIPTION OF EXEMPLARY EMBODIMENTS

Hereinafter, exemplary embodiments of the invention will be described in detail with Example and Comparative Example with reference to FIGS. 1 to 6. The examples described below, given by way of example of a sealed battery terminal and a nonaqueous electrolyte secondary battery for embodying the technical spirit of the invention, are not intended to limit the invention. The invention may be equally applied to various types of sealed batteries, such as a sealed battery using an aqueous electrolyte, without departing from the spirit and scope of the invention as described in the appended claims.

Figure 1:
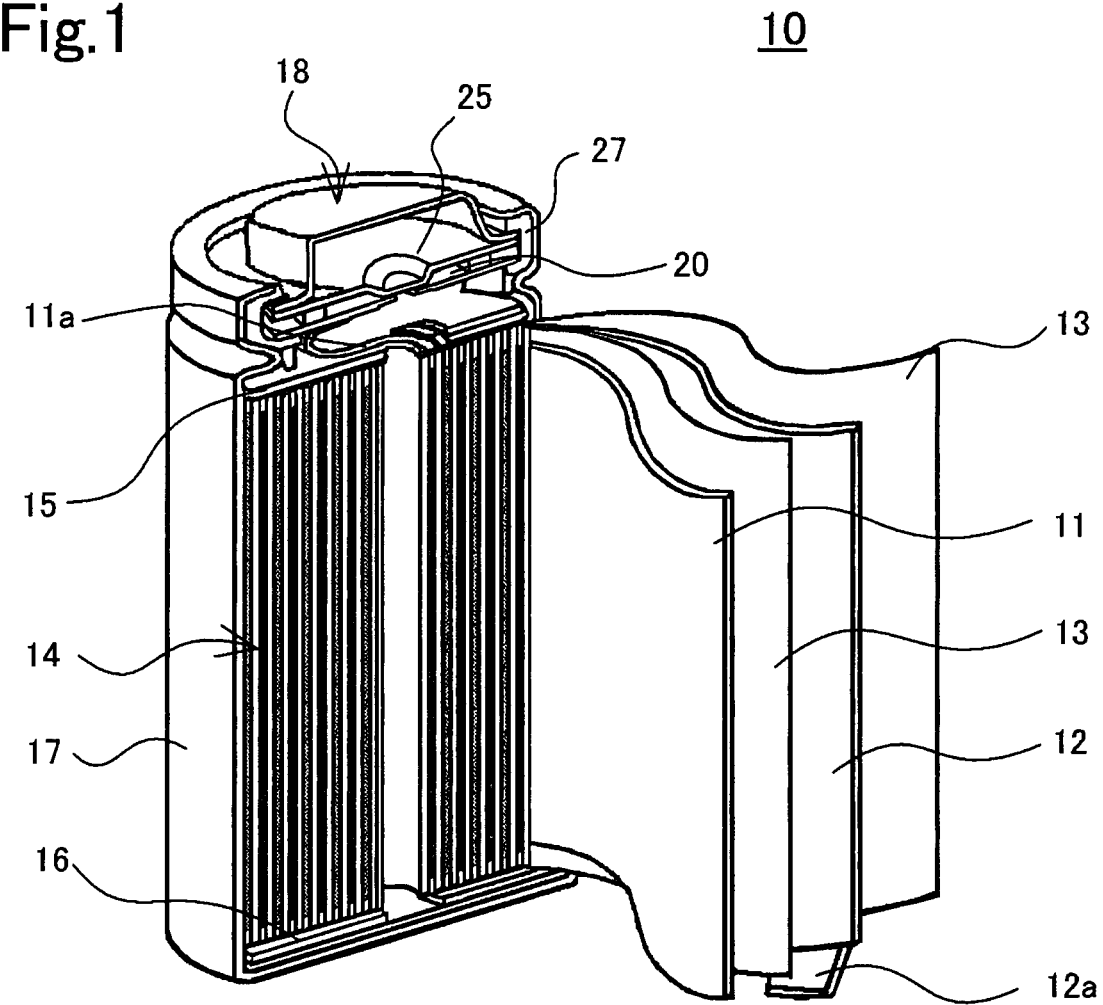
FIG. 1 is a sectional view of a nonaqueous electrolyte secondary battery of Example.
Figure 2:
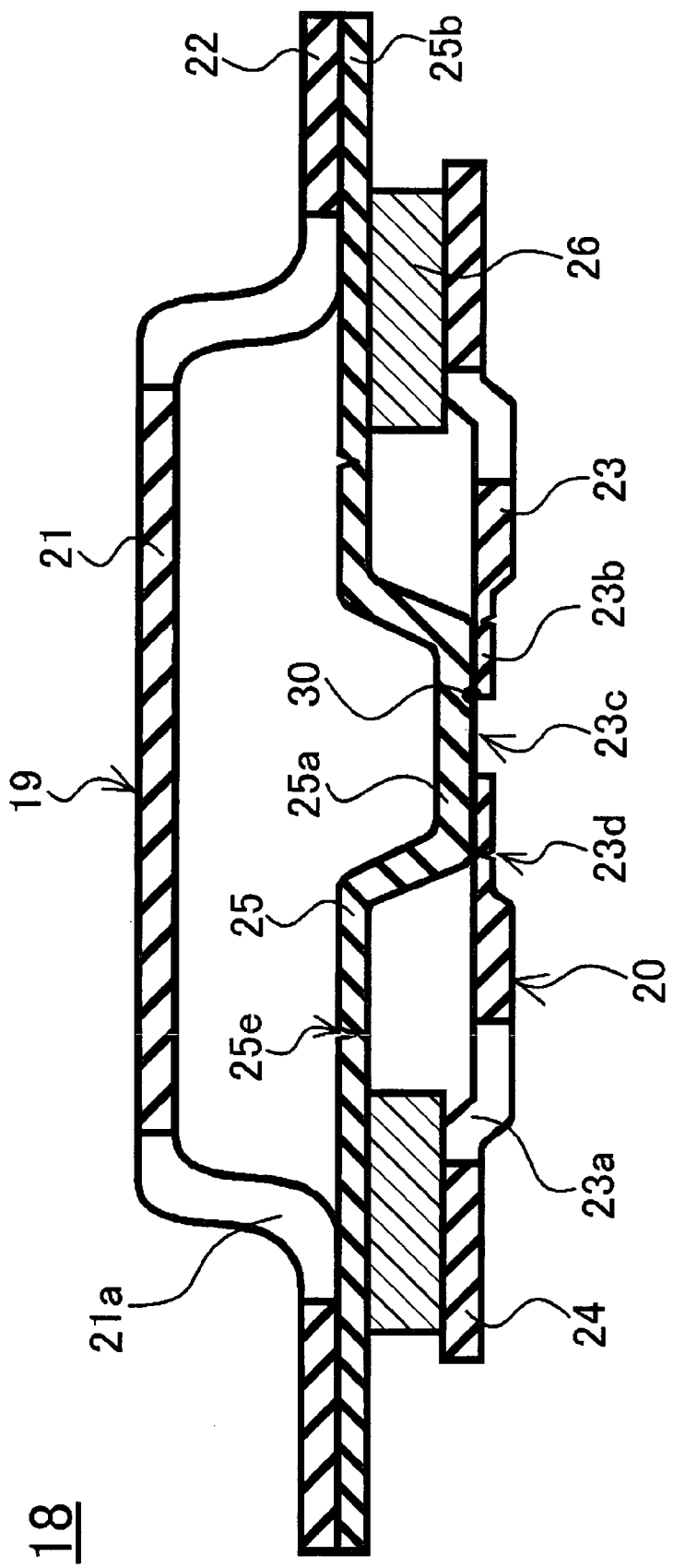
FIG. 2 is an enlarged sectional view of the terminal part shown in FIG. 1.
Figure 3:
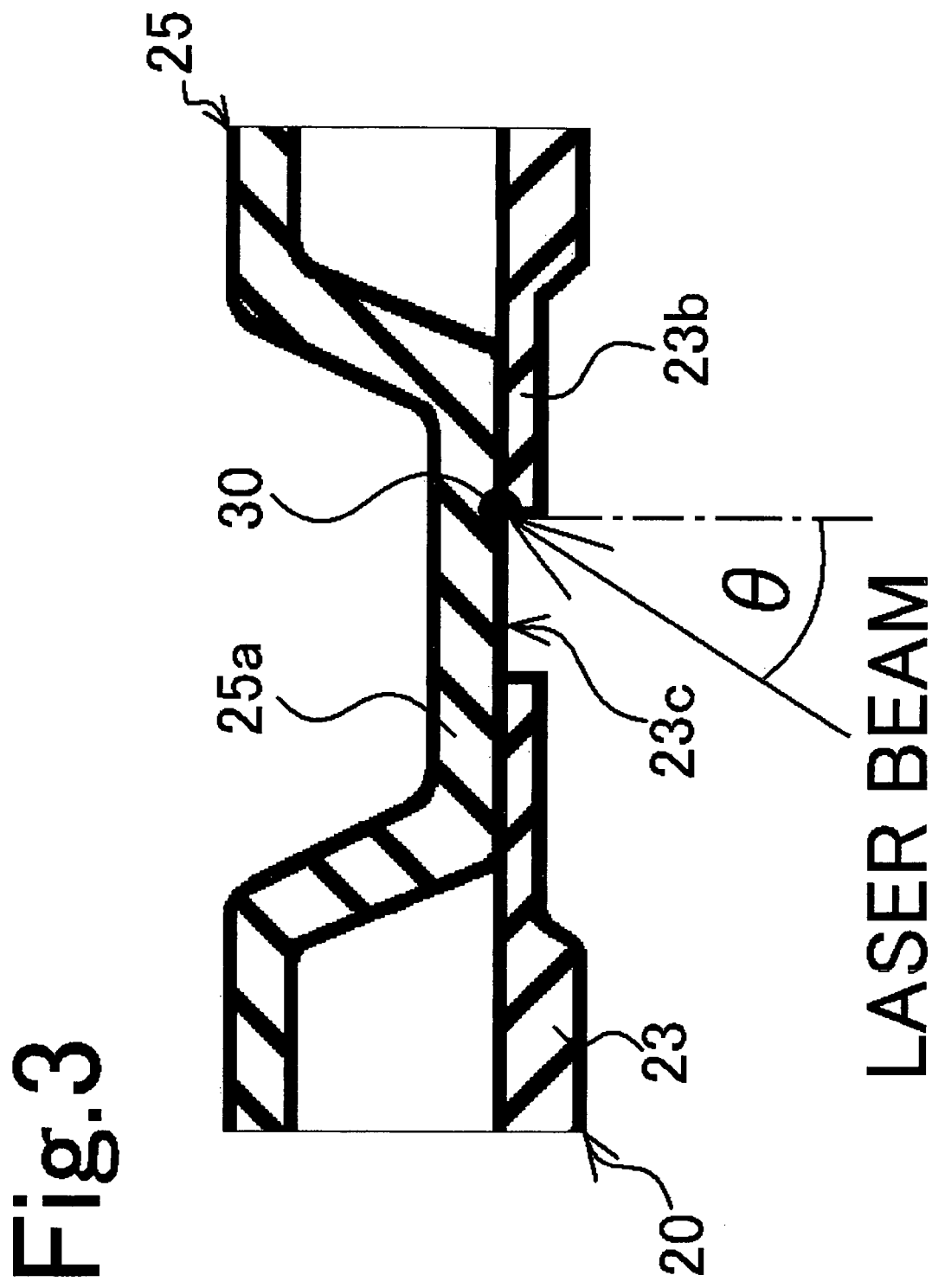
FIG. 3 is a schematic sectional view of the welded part in the terminal part of Example.
Figure 4:
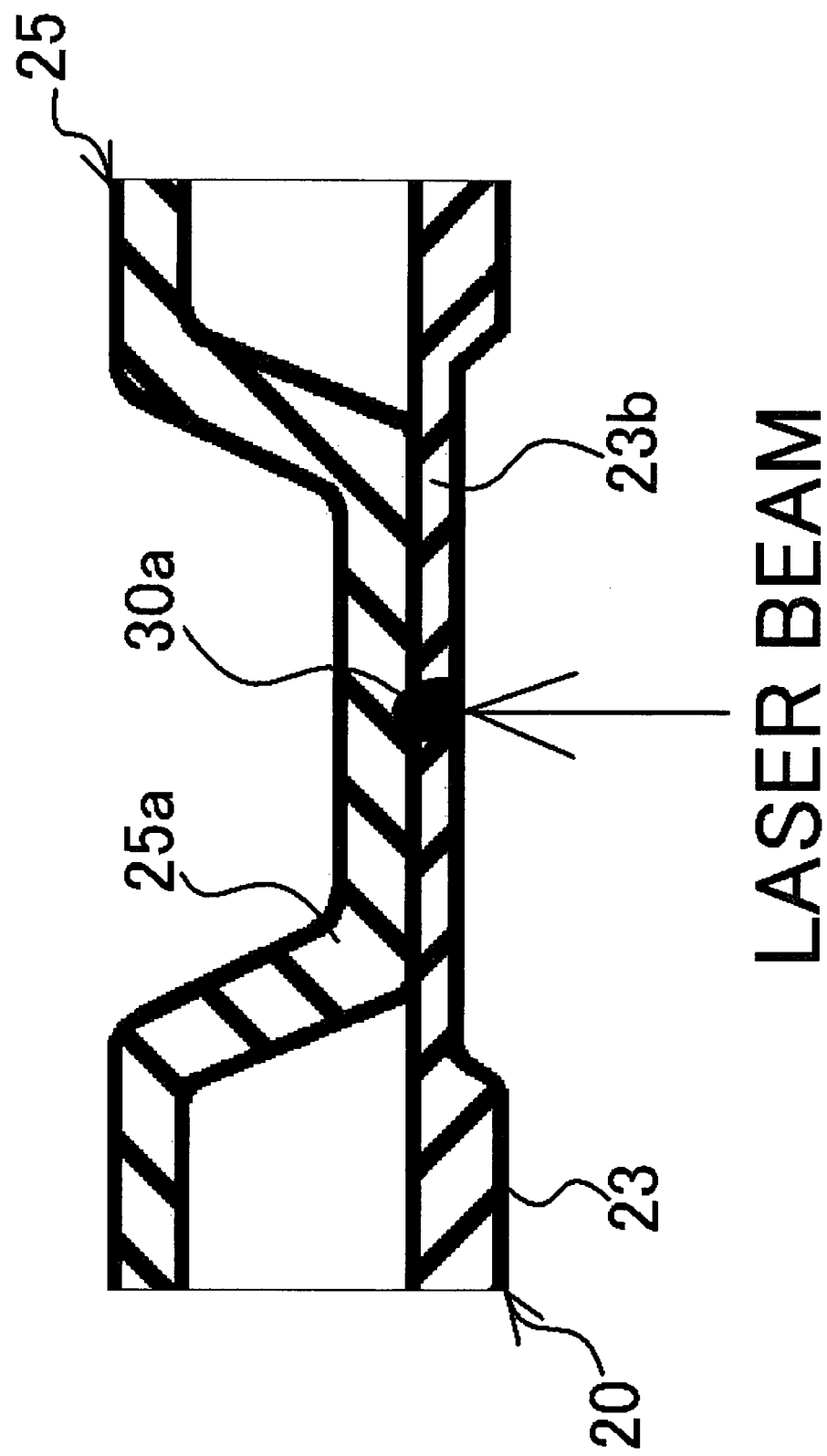
FIG. 4 is a schematic sectional view of a welded part of a terminal part of Comparative Example.
Figure 5:
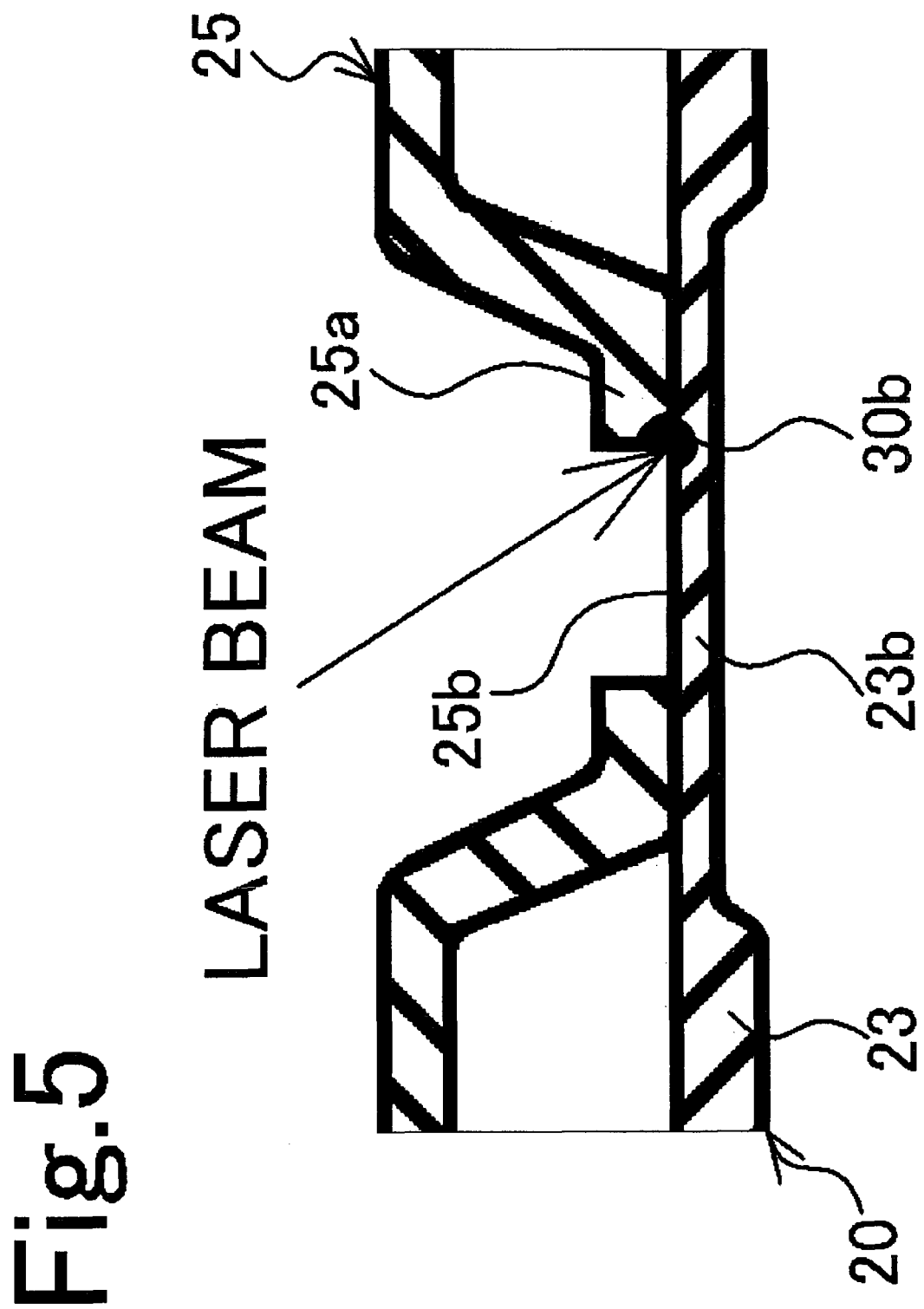
FIG. 5 is a schematic sectional view of a welded part in a terminal part of First Modified Example.
Figure 6:
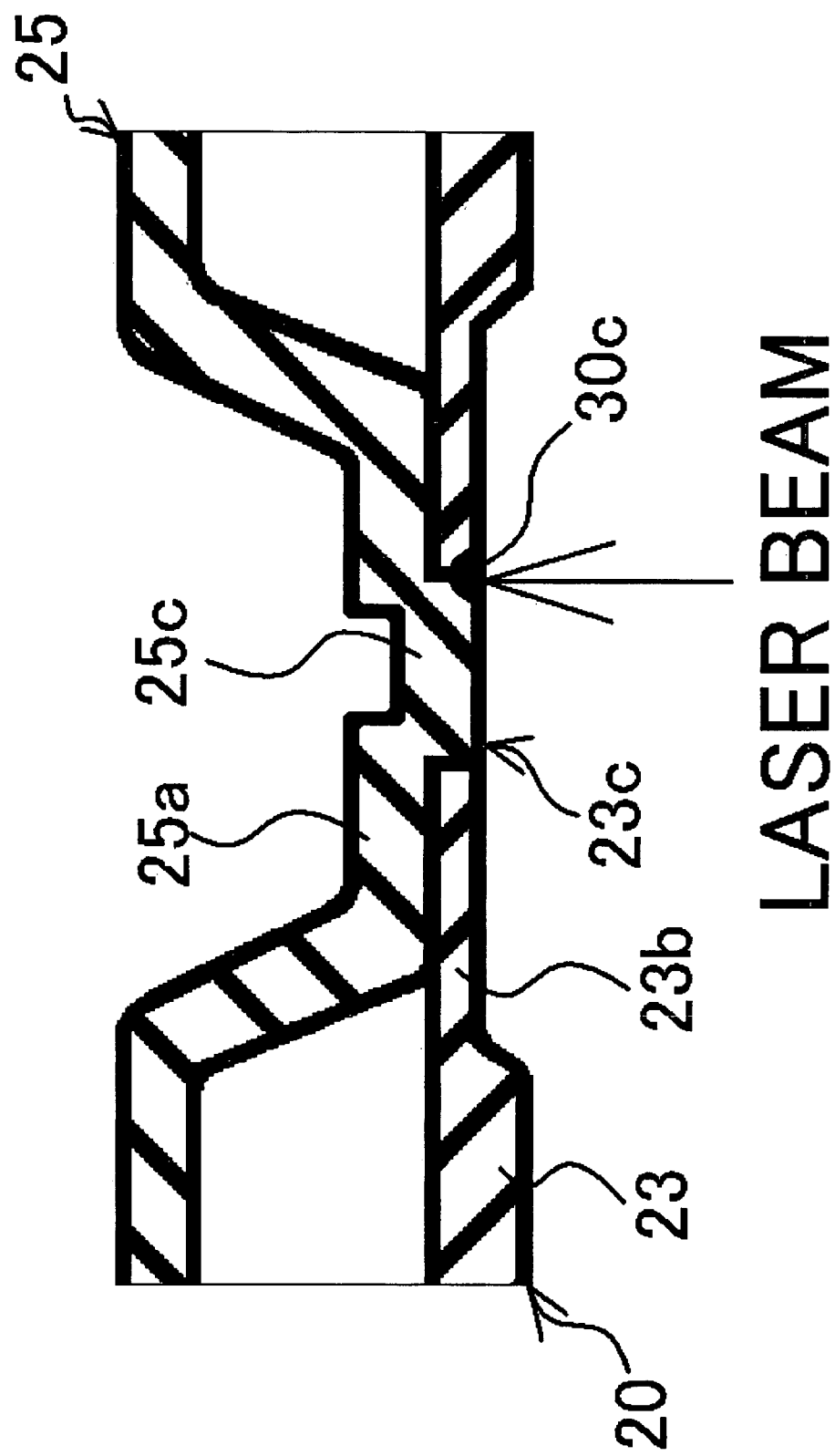
FIG. 6 is a schematic sectional view of a welded part in a terminal part of Second Modified Example.
Figure 7:
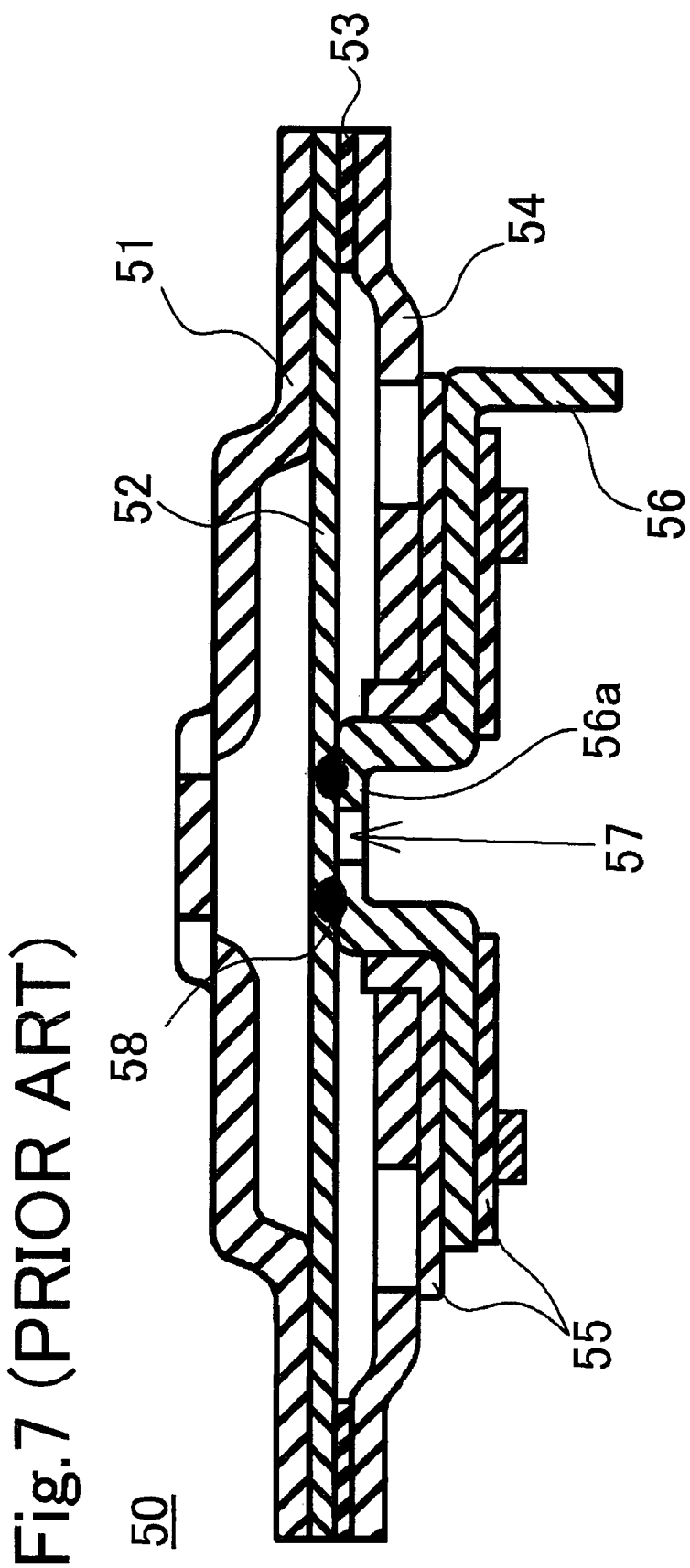
FIG. 7 is a longitudinal sectional view of a related-art sealed battery terminal.

FIG. 1 is a sectional view of a nonaqueous electrolyte secondary battery of Example. FIG. 2 is an enlarged sectional view of the terminal part in FIG. 1. FIG. 3 is a schematic sectional view of the welded part in the terminal part of Example. FIG. 4 is a schematic sectional view of a welded part of a terminal part of Comparative Example. FIG. 5 is a schematic sectional view of a welded part of a terminal part of First Modified Example. FIG. 6 is a schematic sectional view of a welded part in a terminal part of Second Modified Example.

First Example

First, a specific structure of a nonaqueous electrolyte secondary battery of Example will be described. The nonaqueous electrolyte secondary battery 10 is manufactured in the following manner: a spiral electrode 14 is prepared by rolling a positive electrode plate 11 and a negative electrode plate 12 interposing a separator 13 between the plates; insulating plates 15 and 16 are placed on a top and a bottom of the spiral electrode 14, respectively; the spiral electrode 14 and the insulating plates 15 and 16 are put into a cylindrical shaped battery outer can 17 made of steel, where the outer can 17 is also a negative electrode terminal; a current collecting tab 12a of the negative electrode plate 12 is welded on an inner bottom part of the battery outer can 17 and a current collecting tab 11a of the positive electrode plate 11 is welded on a terminal plate 20 of a positive electrode terminal 18 having a safety valve; a predetermined nonaqueous electrolyte is poured from an opening part of the battery outer can 17; and then the battery outer can 17 is sealed up with the positive electrode terminal 18.

Specifically, as shown in FIG. 2, the positive electrode terminal 18 includes a steel terminal cap 19 formed reverse-dish-shaped (cap-shaped) and an aluminum terminal plate 20 formed dish-shaped. The terminal cap 19 includes a convex part 21 protruded outside the battery and a flat flange part 22 as a base of the convex part 21, and a plurality of air vent holes 21a are arranged at a corner of the convex part 21. On the other hand, the terminal plate 20 includes a concave part 23 protruded inside the battery and a flat flange part 24 as a base of the concave part 23. Air vent holes 23a are arranged at a corner of the concave part 23. In addition, inside of the terminal cap 19 and the terminal plate 20, a rupture disk 25 made of aluminum or the like is set, and the rupture disk has a safety valve function which is deformed when a gas pressure in the battery increases to reach a predetermined pressure or more.

A supporting part 23b thinner than the surround having a thickness of 0.1 to 0.5 mm is formed at a central portion of the concave part 23 of the terminal plate 20, an opening 23c is formed at a central portion of the supporting part 23b, and a notch 23d with a wall thickness of 0.02 to 0.15 mm is formed around the opening 23c so as to have a thinner-wall than the surround. The notch 23d is formed in order that when the internal pressure of the battery increases, with deformation of the rupture disk 25, the supporting part 23b of the concave part 23 of the terminal plate 20 welded on the rupture disk 25 is broken from the notch 23d by priority, and then an electrical connection between the terminal cap 19 and the terminal plate 20 is broken so that the battery internal pressure would not be excessive by a continuous abnormal reaction. Even in a structure having only the supporting part 23b without the notch 23d, since supporting part 23b is thinner than the other part of the terminal plate 23, the supporting part 23b is broken by the deformation of the rupture disk 25 to break the current. A welded part 30 is arranged between a lowest part of the concave part 25a of the rupture disk 25 and the supporting part 23b of the concave part 23 of the terminal plate 20, and a detailed structure of the welded part 30 will be described later.

The rupture disk 25 includes a concave part 25a and a flange part 25b, and is composed of, for example, aluminum with a thickness of 0.3 to 0.5 mm. A lowest part of the concave part 25a of the rupture disk 25 is arranged to abut on a surface of the supporting part 23b of the concave part 23 of the terminal plate 20.

Furthermore, in the rupture disk 25, a notch 25e is formed around the concave part 25a so as to have a partial thin-wall. The notch 25e is formed in order that when the internal pressure of the battery increases largely, the rupture disk 25 is broken from the notch 25e part so that the battery internal pressure would not be excessive.

Furthermore, the flange part 25b of the rupture disk 25 is interposed between the flange part 22 of the terminal cap 19 and the flange part 24 of the terminal plate 20 through an intermediary of an annular insulator 26 between the flange parts 25b and 24. Furthermore, the flange part 22 of the terminal cap 19, the flange part 25b of the rupture disk 25, and the flange part 24 of the terminal plate 20 are sealed not to leak a liquid through an intermediary of, for example, an insulating gasket 27 made of polypropylene (PP) (see FIG. 1) by crimping an open end of the battery outer can 17 to the terminal cap 19.

With this structure, the nonaqueous electrolyte secondary battery 10 is a sealed nonaqueous electrolyte secondary battery with extremely high safety, because when a gas pressure in the battery increases to reach a predetermined pressure or more, the concave part 25a of the rupture disk 25 is deformed to break the notch 23d of the terminal plate 20 through the welded part 30 between the rupture disk 25 and the concave part 23 of the terminal plate 20, so that the electrical contact between the rupture disk 25 and the terminal plate 20 is broken to break a current.

Here, a specific structure of the welded part 30 formed between the lowest part of the concave part 25a of the rupture disk 25 and the supporting part 23b of the concave part 23 of the terminal plate 20 in the positive electrode terminal 18 adopted in Example will be described using FIG. 3. The welded part 30 is formed by a laser beam irradiation at a position abutting both an inner periphery of the opening 23c formed in the supporting part 23b of the concave part 23 of the terminal plate 20 and the lowest part of the concave part 25a of the rupture disk 25 from a center side of the opening 23c in an oblique direction, that is, by what is called fillet welding. In FIG. 3, the notches formed in the terminal plate 20 and the rupture disk 25 are left out. The welded parts 30 are formed at a plurality of places along the inner periphery of the opening 23c formed in the supporting part 23b of the concave part 23 of the terminal plate 20, and preferably at eight places. If the welded part 30 is formed in only one spot, since a breaking strength of the welded part 30 has a directional property, a working pressure as the rupture disk 25 is apt to vary. When a plurality of places is welded, preferably, respective welding places are arranged symmetrically so that the breaking strength of the welded part 30 would be hard to have the directional property.

Preferably, in the laser beam irradiation to form the welded part 30, an angle θ between an irradiation direction and an axis that is perpendicular to the opening 23c is in a range of 20°≤θ≤60°. If the irradiation is conducted within the angle range, since the irradiation laser beam energy is absorbed almost equally between the rupture disk 25 and the supporting part 23b of the terminal plate 20, a good welded part 30 can be formed by even a small output power. If the angle θ is less than 20°, the irradiation direction of the laser beam is very close to the perpendicular axis so that it becomes difficult to emit accurately at the position abutting both the inner periphery of the opening 23c formed in the supporting part 23b of the concave part 23 of the terminal plate 20 and the lowest part of the concave part 25a of the rupture disk 25, and further, since the laser beam is emitted strongly on the lowest part of the concave part 25a of the rupture disk 25, it becomes difficult to form a good welded part 30. Furthermore, if the angle θ is more than 60°, a diameter of the opening 23c has to be enlarged to irradiate a predetermined welding place, and further, since the laser beam is emitted strongly on a wall of the opening 23c formed in the supporting part 23b of the concave part 23 of the terminal plate 20, it becomes difficult to form a good welded part 30.

Here, an effect of the welded part 30 formed between the lowest part of the concave part 25a of the rupture disk 25 and the supporting part 23b of the concave part 23 of the terminal plate 20 adopted in the positive electrode terminal 18 of Example will be described in contrast to a case of Comparative Example. As shown in FIG. 4, in a positive electrode terminal 18 of Comparative Example, the opening is arranged in neither the lowest part of the concave part 25a of the rupture disk 25 nor the supporting part 23b of the concave part 23 of the terminal plate 20, and a welded part 30a is formed by full penetration welding with a direct laser beam irradiation on the supporting part 23b in a perpendicular direction. In FIG. 4, the notches are left out, and detailed descriptions of the same structure parts as in FIG. 3 are also left out with the same reference marks.

Furthermore, the shapes, thicknesses, and sizes of the rupture disk 25 and the terminal plate 20, and the formed positions and the depths of the notches adopted in the positive electrode terminal 18 of Comparative Example were all the same as those in Example except for not forming the opening 23c in the terminal plate 20. Furthermore, in both Example and Comparative Example, eight laser welding positions were formed so as to be symmetrical. Then, the positive electrode terminals 18 of Example and Comparative Example were installed to the battery outer cans 17 shown in FIG. 1 (a spiral electrode is not used), and breaking states were examined with a gradual increase of the pressure in the battery outer cans 17 from outside.

Standard conditions of the laser welding common in Example and Comparative Example are as shown below. In order to prevent a melting part quenching, a laser pulse with a pulse width of 1.2 ms and a pulse energy of 3 J using waveform control which made a latter part of the pulse a low power was used, and the laser pulse was focused to about a focusing diameter of 0.4 to 0.6 mm to be a peak power density of $16 \times 10^3$ W/mm². Then, welding states (strength of the welding) of the respective specimens of Example and Comparative Example were examined when the peak power was varied from the standard state in a range from −40% to +30% and pressure was applied to ten specimens at each peak power until current breaking. The strength of the welding was judged as follows. The concluded results are shown in Table 1.

A: Good (The notch part was broken.)
B: Weak (The welded part between the rupture disk and the terminal plate broke away and the notch part was not broken.)
C: Strong (The rupture disk had a laser trace or a hole.)

According to the results shown in Table 1, in the case of the positive electrode terminal 18 of Example, the welded states are good in a range of between +20% and −30% with respect to the standard peak power, but in those of Comparative Example, the welded states are good only in a range of between +10% and −10% with respect to the standard peak power. Accordingly, in the case of Example, in comparison with those of Comparative Example, it is clear that a range where the good welded part is formed even if the laser beam power is varied, that is, a range where the normally working rupture disk as the safety valve is obtained, is extended. In this manner, if the laser beam is emitted from near the center of the opening 23c of the terminal plate 23 in an oblique direction, since a welding position is easy to be targeted, a welded spot with a predetermined size at a predetermined position can be formed accurately. Thus, according to some aspects of the invention, it is clear that a laser welding condition between the lowest part of the concave part 25a of the rupture disk 25 and the terminal plate 20 is extended and the terminal has good productivity with stabilized quality.

In Example, the opening 23c was formed at the center part of the supporting part 23b of the terminal plate 20, but the opening may be formed at the lowest part of the concave part 25a of the rupture disk 25. The First Modified Example is shown in FIG. 5. In FIG. 5, the notches are left out, and detailed descriptions of the same structure parts as in FIG. 3 are also left out with the same reference marks.

In the First Modified Example, an opening 25b is formed in the lowest part of the concave part 25a of the rupture disk 25, and a welded part 30b is formed along the opening part 25b between the rupture disk 25 and the terminal plate 20. In this case, in order to keep the sealed state, the welded part 30b has to be formed along a circumference of the opening 25b of the rupture disk 25. However, also in the First Modified Example, since the laser beam can be emitted from near the center of the opening 25b of the rupture disk 25 in an oblique direction, the sealed state can be kept by circumference welding easily.

Furthermore, Second Modified Example is shown in FIG. 6. In FIG. 6, the notches are left out and detailed descriptions of the same structure parts as in FIG. 3 are also left out with the same reference marks. In the Second Modified Example, a convex part 25c is formed in the rupture disk 25 and the convex part 25c is fitted to the opening 23c formed in the terminal plate 23. According to the Second Modified Example, the laser welding can be performed on an abutting part of both an inner periphery of the opening 23c formed in the supporting part 23b of the concave part 23 of the terminal plate 20 and an outer periphery of the convex part 25c of the rupture disk 25, from the terminal plate 20 side in a perpen-

TABLE 1

| | Operating state | Peak power (%) | | | | | | | |
|---|---|---|---|---|---|---|---|---|---|
| | | −40 | −30 | −20 | −10 | Standard | +10 | +20 | +30 |
| Example | A | 2/10 | 10/10 | 10/10 | 10/10 | 10/10 | 10/10 | 10/10 | 3/10 |
| | B | 8/10 | 0/10 | 0/10 | 0/10 | 0/10 | 0/10 | 0/10 | 0/10 |
| | C | 0/10 | 0/10 | 0/10 | 0/10 | 0/10 | 0/10 | 0/10 | 7/10 |
| Comparative Example | A | 0/10 | 0/10 | 7/10 | 10/10 | 10/10 | 10/10 | 8/10 | 0/10 |
| | B | 10/10 | 10/10 | 3/10 | 0/10 | 0/10 | 0/10 | 0/10 | 0/10 |
| | C | 0/10 | 0/10 | 0/10 | 0/10 | 0/10 | 0/10 | 2/10 | 10/10 |

A: Good (The notch part was broken.)
B: Weak (The welded part between the rupture disk and the terminal plate broke away and the notch part was not broken.)
C: Strong (The rupture disk had a laser trace or a hole.)
(A numerator is the number of batteries in the operating state, and a denominator is the number of batteries tested.)

dicular direction to the opening 23c. Thus, according to the Second Modified Example, the welded part 30c can be formed easily.

In Example and Modified Examples, the laser welding as a welding method is adopted, however the welding method is not limited to the laser welding and well-known high energy beam welding such as electron beam welding may be used. Furthermore, in Example and Modified Examples, the descriptions are about the positive electrode terminal, however the invention is applicable to a negative electrode terminal in the same manner.

What is claimed is:

1. A sealed battery comprising:
an electrode assembly;
a rupture disk made of flexible electrically-conductive material electrically connected to the electrode assembly; and
an electrically-conductive terminal plate abutting the rupture disk;
an opening being formed in the terminal plate, and the rupture disk being arranged to close the opening,
an abutting part of an inner periphery of the opening of the terminal plate and the rupture disk being welded at a welded position by a high energy beam, and the terminal plate being provided with a thicker portion and a thinner portion thinner than the thicker portion of the terminal plate,
wherein
the electrically-conductive terminal plate is configured to break in the thinner portion at a break position away from the welded position when a gas pressure in the battery increases to a predetermined pressure or more.

2. The sealed battery according to claim 1, wherein a welded part by the high energy beam in the sealed battery is irradiated with the high energy beam from near the center of the opening in an oblique direction.

3. The sealed battery according to claim 2, wherein the irradiation direction of the high energy beam in the sealed battery is in a range of 20° to 60° with respect to an axis that is perpendicular to the opening.

4. The sealed battery according to claim 1, wherein a convex part fitting the opening formed in the terminal plate is formed in the rupture disk in the sealed battery, and the welded part by the high energy beam is an abutting part of an outer periphery edge of the convex part of the rupture disk and the inner periphery of the opening of the terminal plate.

5. The sealed battery according to claim 1, wherein the thinner portion of the terminal plate in the sealed battery is provided with a notch that is thinner than the thinner portion and that surrounds welding position.

6. The sealed battery according to claim 1, wherein the high energy beam is a laser beam or an electron beam.

7. A sealed battery comprising:
an electrode assembly;
a rupture disk made of flexible electrically-conductive material electrically connected to the electrode assembly; and
an electrically-conductive terminal plate abutting the rupture disk;
an opening being formed in the terminal plate, and the rupture disk being arranged to close the opening,
an abutting part of an edge portion of the opening of the terminal plate and the rupture disk being welded at a welded position, the terminal plate being provided with a thicker portion and a thinner portion thinner than the thicker portion of the terminal plate,
wherein
the terminal plate is configured to break in the thinner portion at a break position away from the welded position when a gas pressure in the battery increases to a predetermined pressure or more.

8. The sealed battery according to claim 7, wherein
a notch portion is provided in the thinner portion; and
the notch portion breaks when the internal pressure of the battery increases to a predetermined value or more.

9. The sealed battery according to claim 7, wherein the abutting part of the edge portion of the opening of the terminal plate and the rupture disk are welded by a high energy beam.

10. The sealed battery according to claim 8, wherein the abutting part of an edge portion of the opening of the terminal plate and the rupture disk are welded by a high energy beam.

11. The sealed battery according to claim 7, wherein
an electrical insulator is arranged between a portion of the rupture disk and a portion of the terminal plate,
the electrical insulator has a gap,
the terminal plate has a first surface opposing to the rupture disk,
the electrical insulator has a second surface physically contacting the first surface of the terminal plate,
the rupture disk protrudes through said gap toward the terminal plate at the abutting part of an edge portion of the opening of the terminal plate and the rupture disk,
the rupture disk protruding to a point closer to the electrode assembly than the second surface.

12. The sealed battery according to claim 7, wherein
an electrical insulator is arranged between a portion of said rupture disk and a portion of said terminal plate, and
wherein said electrical insulator physically contacts said rupture disk and said terminal plate.

* * * * *